Aug. 31, 1954　　　　　H. HEINIG　　　　　2,687,824
ICE-CREAM CONE VENDING MACHINE
Filed June 4, 1952　　　　　　　　　　2 Sheets-Sheet 1

INVENTOR.
HUGHES HEINIG.
BY
Robert A. Sloan
ATTORNEY.

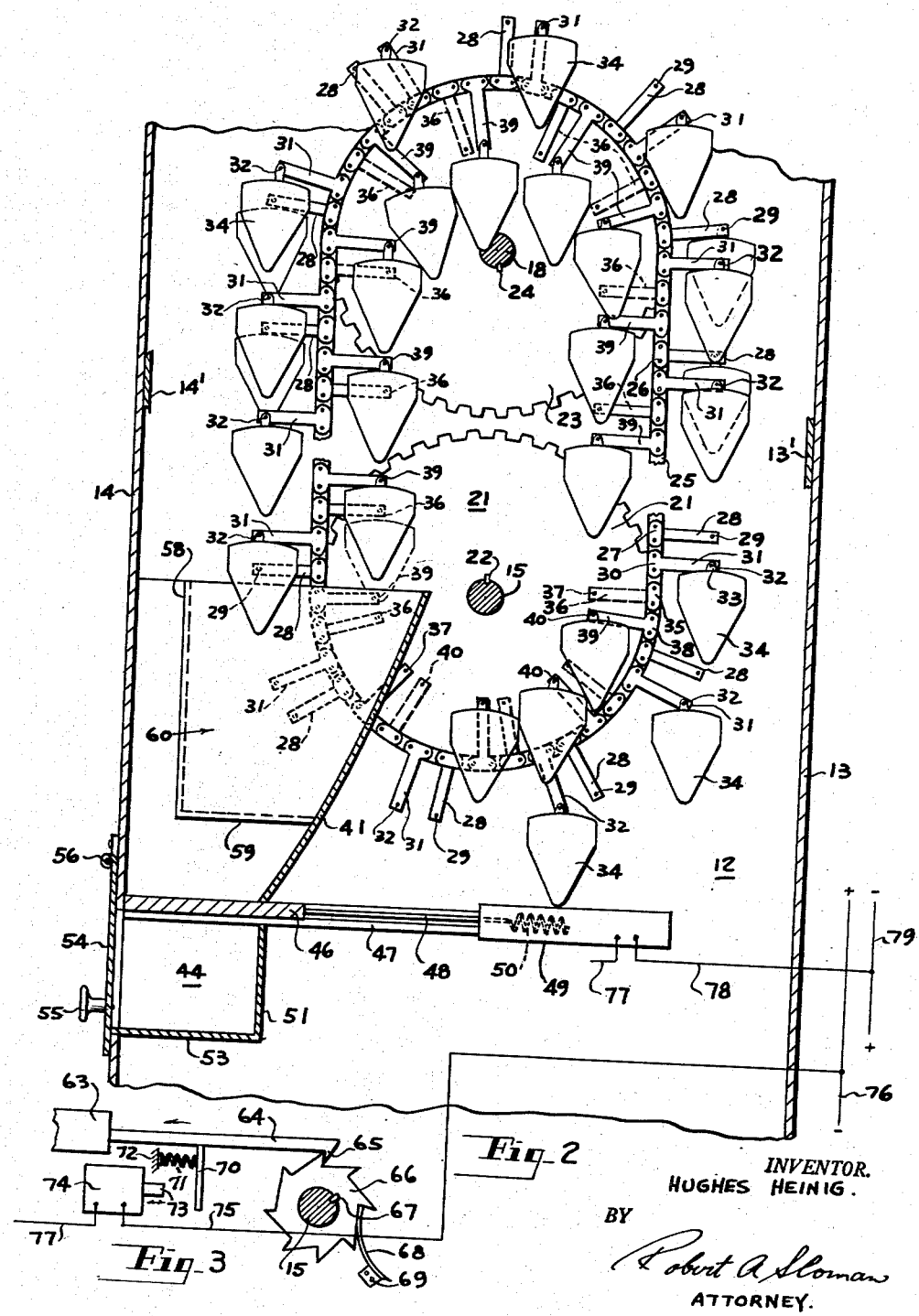

Patented Aug. 31, 1954

2,687,824

UNITED STATES PATENT OFFICE 2,687,824

ICE-CREAM CONE VENDING MACHINE

Hughes Heinig, Detroit, Mich.

Application June 4, 1952, Serial No. 291,734

7 Claims. (Cl. 221—80)

This invention relates to an ice cream cone vending machine and more particularly to a coin controlled ice cream cone vending device. This application is a continuation in part of my copending patent application Serial Number 256,577, filed November 15, 1951.

It is the object of the present invention to provide a very simplified coin operative device for dispensing ice cream cones.

It is the further object of this invention to provide an ice cream cone vending device which is a simplification over my copending patent application and which has a minimum of working parts.

It is the further object of this invention to provide a continuous ice cream cone supporting conveyor within a housing together with mechanism for effecting downward movement of the conveyor which supports the cones together with a mechanism for disengaging the cones from the conveyor.

These and other objects will be seen from the following specification and claims in conjunction with the appended drawing in which:

Fig. 2 is a fragmentary section taken on line 2—2 of Fig. 1.

Fig. 3 is a section taken on line 3—3 of Fig. 1; and

Figures 1, 4:
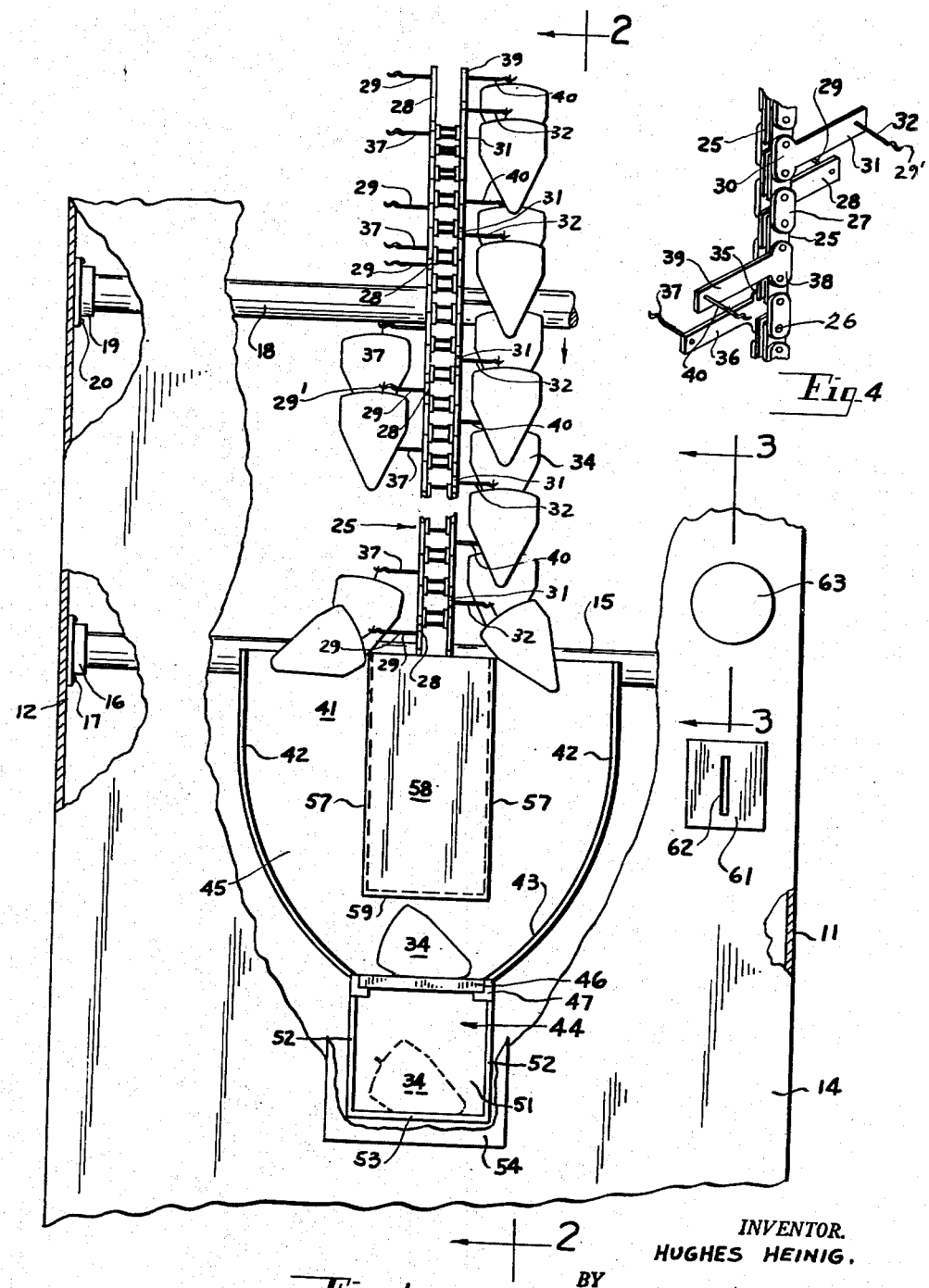
Fig. 1 is a fragmentary front elevational view of the ice cream cone vending machine with the front wall broken away for illustration.
Fig. 4 is a fragmentary perspective view of a portion of the ice cream cone supporting conveyor chain, showing the arrangement of the cone supports thereon.

It will be understood that the above drawings illustrate merely a preferred embodiment of the invention, and that other embodiments are contemplated within the scope of the claims hereafter set forth.

Referring to the drawings, the present cone vending machine includes a hollow upright housing with spaced upright side walls 11 and 12 and with front wall 14 and rear wall 13.

A pair of vertically spaced horizontally extending parallel rotatable shafts 15 and 18 are arranged within said housing and the lower shaft 15 is journaled at its opposite ends within the bushing or bearing 16 which is secured to the corresponding side wall 11 or 12 by the rivet or screw 17 such as shown in Fig. 1. Similarly the upper rotative shaft 18 is journaled at its opposite ends within the bushings 19 which are secured as at 20 to the corresponding side wall.

Upright rotatable sprocket wheel 21 is keyed at 22 to the central portion of shaft 15; and vertically aligned therewith is a second sprocket wheel 23 keyed as at 24 to the upper rotative shaft 18.

The said sprocket wheels are interconnected by the continuous sprocket chain 25 which extends around sprockets 21 and 23 and interconnects the same for movement in unison, as shown in the drawing.

The sprocket chain 25 is a conventional type wherein the various links thereof are interconnected by the transverse pins 26 for illustration. It is contemplated that there be provided extensions secured to the links of the chain arranged upon opposite sides of the chain and also extending in opposite directions. Upon each of the extensions at its outer end is a transversely extending cone supporting pin which regardless of the position of the chain will always be maintained in a horizontal position parallel to the shafts 15 and 18.

For this purpose referring to Fig. 2, there is provided a lateral extension arm 28 which has a base portion similar to that which is shown at 27 and which has corresponding upper and lower openings which receive the transverse ends of the pins 26 which form a part of the sprocket chain. Consequently the arm 28 is maintained at all times at right angles to the portion of the sprocket chain which it connects. Upon the outer end of the arm 28 there is provided a rearwardly extending cone supporting pin 29, which as shown in Fig. 1 has a reverse waved portion 29' at its outer end for supporting a wrapped ice cream cone in the manner hereafter described. This is also shown in Fig. 4. Directly below arm 28 but arranged upon the opposite side of chain 25 is a second arm 31 which has a base portion 30 suitably secured to the sprocket chain 25 as by the pin ends 26. Arm 31 also is provided with a normally arranged cone supporting pin 32, which as shown in Fig. 4, extends in the opposite direction from pin 29. The end portion 29' of said pin is adapted to extend through an apertured portion 33 formed in the upper part of wrapper 34 which covers the ice cream cones shown in Fig. 2. In the preferred embodiment of the invention the two cone supporting pins 29 and 32 are parallel to each other and extend in opposite directions and the vertical distance between said pins is one inch, for illustration. The corresponding arms 28 and 31 extend rearwardly of the sprocket chain 25 towards the rear wall 13 of the vending machine housing and there are also provided additional arms 36 and 39 which extend forwardly from the front portion of the sprocket chain 25.

Referring again to Fig. 2, the forwardly extending arm 36 has a head portion of the same shape as the element 35 shown in Fig. 2 but of course arranged upon the opposite side of the sprocket chain so that the arm 36 is upon the opposite side of said chain from the arm 31. Upon the outer end of the arm 36 there is arranged the laterally projecting pin 37, which as shown in Fig. 4 extends in the same direction as pin 29 and is arranged upon the same side of the sprocket chain 25 as is said pin 29.

Directly below the arm 36 there is still another arm 39, which of course is arranged again upon the opposite side of the chain 25 from the arm 36, and has a base portion 38 which is secured to the sprocket chain as by the pins 26. Upon the outer end of the arm 39, there is a forwardly projecting cone supporting pin 40, which as shown in Fig. 4, is parallel to and extends in the same direction as pin 32.

In the preferred embodiment of the invention, there is one horizontally arranged cone supporting pin for each inch of the sprocket chain. Consequently, twelve cones 34 can be supported for every foot of chain, and the pins and their supporting arms are so arranged upon and with respect to said sprocket chain so that the various cones will not interfere with each other. In the preferred embodiment, the pins 29, 32, 37 and 40 are two inches long and the ice cream cone within its wrapper 34 is supported upon the outer end of each pin upon the waved portion 29' as illustrated in Fig. 1.

The forward portion of the sprocket chain 25 is adapted to move downwardly in the manner hereafter described so that the various wrapped cones 34 will be alternately and successively presented to a portion of the cone chute, so as to disengage the cones from their supporting pins.

Referring to Figs. 1 and 2, the chute has a downwardly and forwardly inclined rear wall portion 41 and a pair of downwardly extending side wall portions 42 which curve inwardly as at points 43 for guiding the cone into the storage compartment 44 from the interior space 45 of said chute. As the wrapped cone 34 descends within the space 45 of the chute, it will come to rest upon the horizontally arranged trap door 46, which as shown in Fig. 2, normally covers compartment 44 for closing off the bottom of the chute 41—45.

Trap door 46 is supported upon the spaced rearwardly extending angle irons or angle elements 47 which act as guide ways for the rearward opening movements of the trap door 46 as shown in Fig. 2. Rearwardly extending shaft 48 is joined to the rear portion of the trap door 46 and forms a part of the reciprocal element of the solenoid 49 which includes a suitable coil spring 50 as diagrammatically shown for effecting a return of the shaft 48 and the trap door 46 to the position of Fig. 2 when the solenoid is de-energized.

The lower storage compartment 44 or delivery chamber includes the rear upright wall 51, the upright spaced side walls 52 and the bottom wall 53 as shown in the drawings; and there is provided upon the front wall 14 of the housing a vertically arranged door 54 with handle 55. Said door is hinged as at 56 to the front wall of the housing and the cone selected may be withdrawn from the chamber 44 by manually lifting door 54 about its hinge 56. The upper portion of the housing adjacent to the sprocket chain 25 and the wrapped cones 34 supported thereon is suitably refrigerated by a mechanism of a conventional type but which forms no part of the present invention and consequently its description is omitted herein. It is contemplated however that the refrigerated compartment of the housing be insulated from the outside atmosphere in any suitable manner such as by coating the interior walls of the housing such as at 14' and 13', for illustration, with a suitable insulating substance. Similarly, it is desirable that the chute opening 45 be closed and this is accomplished by the door 46. Upon the intermittent energization of solenoid 49 in the manner hereafter described, an ice cream cone disengaged from the sprocket chain will be permitted to drop into the delivery chamber 44.

Referring to Fig. 2, it is apparent that there is provided a central compartment 60 formed within the chute 41—45 through which the sprocket chain 25 can move as shown in the drawings. The compartment 60 is bounded by the parallel spaced upright side walls 57, the bottom wall 59, and the front wall 58.

As shown in Fig. 1, the wrapped cones 34 are supported in such a fashion that upon downward movement of the sprocket chain, said cones will engage the top horizontal edges of the side walls 57 so that continued downward movement of the sprocket chain will disengage the cone and its supporting loop 33 from the waved end 29' of the respective cone supporting pin.

As each of the pins 29, 32, 37 and 40 are vertically arranged at a distance of one inch from each other, it is contemplated that there will be intermittent downward one inch movements of the sprocket chain for illustration so that the cones will be alternately presented to the opposite top edges of the side walls 57 of compartment 60 for disengaging the same from their supporting pins. Said cones will drop down through the space 45 upon either side of the chamber 60 to a position upon the trap door 46. If the trap door is open, said cone will drop to the dotted line position shown in Fig. 1.

There is provided upon the front wall 14 of the cone vending machine housing a front plate 61 of a coin control mechanism which is provided with a coin slot 62 and which is adapted upon insertion of the proper coin to momentarily release the plunger handle 63 permitting the same to be manually withdrawn outwardly. The construction of the coin control mechanism forms no part of the present invention and consequently the detail of its structure is omitted. It is sufficient to say, however, that the coin control mechanism is adapted in a conventional manner to momentarily release the plunger handle 63 in the same manner as is done in dispensing machines such as those which dispense cigarettes, for illustration.

Referring to Fig. 3, the handle 63 is connected to the horizontally arranged reciprocal plunger 64 upon the outer end of which is the downwardly projecting pawl 65. Said pawl is adapted for operative engagement with the ratchet wheel 66, which is keyed as at 67 to the shaft 15, and which is retained by the leaf spring 68 anchored to some portion of the housing as at 69. Consequently, upon the insertion of the proper coin within the slot 62 of the coin control mechanism 61, the handle or knob 63 may be withdrawn manually causing the pawl 65 to rotate the ratchet wheel 66 sufficiently as to cause an arcuate movement of the sprocket 21 by a distance of one inch for illustration. Counter-clockwise rotation of the sprocket 21 will effect a downward movement of the front portion of the sprocket chain 25 so as to present the next succeeding wrapped cone 34 to the top horizontal edge of one of side walls 57 of the chambered element 60 and which will in effect as the sprocket chain moves downwardly disengage said cone from its supporting pin causing said cone to drop downwardly within the chute 41—45.

The plunger 64 has a depending arm 70 thereon which is adapted to engage coiled spring 71 anchored to some portion of the housing as at 72 so that upon manual release of the plunger handle 63, said plunger 64 will return to its initial position ready for the next actuation of the ratchet wheel 66.

Upon the forward movement of the plunger 64 by pulling of the knob 63, it is apparent that the extension 70 will engage the movable element 73 of the control switch 74. Said switch is connected by the lead 75 to one power line 76. Said switch is connected to solenoid 49 by the lead wire 77. Solenoid 49 is connected to the other power line by the lead wire 78, said other power line being designated by the numeral 79. Thus upon outward movement of plunger 64 the switch 74 will be actuated for closing the electrical circuit to the solenoid 49 which will cause the plunger 48 to withdraw into the solenoid housing causing a rearward movement of the trap door 46. Consequently, as the cone 34 is disengaged from its supporting pin by the downward movement of the sprocket chain said cone will be free to drop into the delivery compartment 44 inasmuch as the trap door 46 has been rearwardly opened by solenoid 49. Upon the user releasing the knob 63, the same returns to its initial position due to the action of the coil spring 71 and by opening the door 54 the selected cone can be withdrawn from chamber 44.

Figs. 1 and 2 illustrate one ice cream cone vending mechanism wherein all the cones will be of a one pre-determined flavor. It is contemplated that a cone vending machine of this type may include a number of mechanisms such as above described with respect to Figs. 1 and 2 whereby a plurality of different flavors may be dispensed, but naturally a separate operating mechanism and coin control mechanism would be required for each device.

While the above specification has particularly described the element 25 as a sprocket chain, it is regarded that this element might just as well be called a conveyor.

It is contemplated as a part of the present invention that other types of articles may be dispensed from the machine whether requiring refrigeration or not requiring refrigeration as the case may be. The present structure while described with respect to the dispensing of cones might well be adapted for the dispensing of other articles.

Having described my invention, reference should now be had to the claims which follow for determining the scope thereof.

I claim:

1. An ice cream cone vending machine comprising a hollow upright housing having a front wall, an upright conveyor movably mounted and supported within said housing, a plurality of horizontally extending vertically spaced cone supporting pins projecting from said conveyor throughout its length, an upright chute within said housing with its upper end adjacent the lower end of said conveyor, the lower end of said chute terminating in the front wall of said housing, and an upright chambered deflector housing arranged within said chute within and through which said conveyor extends, the width of said deflector housing being such that said pins will pass through the same, but the upper horizontal edges of said deflector housing will engage said cones as said conveyor is intermittently moved downwardly for successively disengaging a cone from its supporting pin permitting the same to drop in said chute.

2. An ice cream cone vending machine comprising a hollow upright housing having a front wall, an upright conveyor movably mounted and supported within said housing, a plurality of horizontally extending vertically spaced cone supporting pins projecting from opposite sides of said conveyor and extending in opposite directions throughout the length of said conveyor, an upright chute within said housing with its upper end adjacent the lower end of said conveyor, the lower end of said chute terminating in the front wall of said housing, and an upright chambered deflector housing arranged within said chute within and through which said conveyor extends, the width of said deflector housing being such that said pins will pass through the same, but the upper horizontal edges of said deflector housing will engage said cones as said conveyor is intermittently moved downwardly for successively disengaging a cone from its supporting pin permitting the same to drop in said chute.

3. An ice cream cone vending machine comprising a hollow upright housing having a front wall, an upright conveyor movably mounted and supported within said housing, a plurality of horizontally extending vertically spaced cone supporting pins projecting from said conveyor throughout its length, an upright chute within said housing with its upper end adjacent the lower end of said conveyor, the lower end of said chute terminating in the front wall of said housing, a pair of upright vertically aligned sprocket wheels journaled within said housing interconnecting and around which said conveyor extends, and an upright chambered deflector housing arranged within said chute within and through which said conveyor extends, the width of said deflector housing being such that said pins will pass through the same, but the upper horizontal edges of said deflector housing will engage said cones as said conveyor is intermittently moved downwardly for sucessively disengaging a cone from its supporting pin permitting the same to drop in said chute.

4. An ice cream cone vending machine comprising a hollow upright housing having a front wall, an upright conveyor movably mounted and supported within said housing, a plurality of horizontally extending vertically spaced cone supporting pins projecting from said conveyor throughout its length, an upright chute within said housing with its upper end adjacent the lower end of said conveyor, the lower end of said chute terminating in the front wall of said housing, a pair of upright vertically aligned sprocket wheels journaled within said housing interconnecting and around which said conveyor extends, parallel vertically aligned horizontally extending shafts secured to said sprocket wheels and journaled and supported within and upon said housing, and an upright chambered deflector housing arranged within said chute within and through said conveyor extends, the width of said deflector housing being such that said pins will pass through the same, but the upper horizontal edges of said deflector housing will engage said cones as said conveyor is intermittently moved downwardly for successively disengaging a cone from its supporting pin permitting the same to drop in said chute.

5. An ice cream cone vending machine comprising a hollow upright housing having a front wall, an upright conveyor movably mounted and supported within said housing a plurality of horizontally extending vertically spaced cone supporting pins projecting from said conveyor throughout its length, an upright chute within said housing with its upper end adjacent the lower end of said conveyor, the lower end of said chute terminating in the front wall of said housing, a pair of upright vertically aligned sprocket wheels journaled within said housing interconnecting and around which said conveyor extends, parallel vertically aligned horizontally extending shafts secured to said sprocket wheels and journaled and supported within and upon said housing, a ratchet wheel secured to one of said shafts, a manually operated longitudinally movable pawl engageable with said wheel for effecting intermittent movements thereof whereby said conveyor will move intermittently downward upon its sprocket wheels, and an upright chambered deflector housing arranged within said chute within and through which said conveyor extends, the width of said deflector housing being such that said pins will pass through the same, but the upper horizontal edges of said deflector housing will engage said cones as said conveyor is intermittently moved downwardly for successively disengaging a cone from its supporting pin permitting the same to drop in said chute.

6. An ice cream cone vending machine comprising a hollow upright housing having a front wall, an upright conveyor movably mounted and supported within said housing, a pair of vertically spaced substantially parallel arms secured to said conveyor upon its opposite sides and extending in the same direction at right angles to said conveyor, horizontally arranged cone supporting pins projecting normally outward from the outer ends of said arms and extending in opposite directions, a second pair of vertically spaced substantially parallel arms secured to said conveyor in vertically spaced relation to said first arms, arranged upon opposite sides of said conveyor and extending in the same direction opposite from that of said first arms, and arranged at right angles to said conveyor, horizontally arranged cone supporting pins projecting normally outward from the outer ends of said second pair of arms and extending in opposite directions, and an upright chute within said housing with its upper end adjacent the lower end of said conveyor and cooperable with a cone thereon for disengaging the cone from its supporting pin as the conveyor moves downwardly, the lower end of said chute terminating in the front wall of said housing.

7. An ice cream cone vending machine comprising a hollow upright housing having a front wall, an upright conveyor movably mounted and supported within said housing, a pair of vertically spaced substantially parallel arms secured to said conveyor upon its opposite sides and extending in the same direction at right angles to said conveyor, horizontally arranged cone supporting pins projecting normally outward from the outer ends of said arms and extending in opposite directions, a second pair of vertically spaced substantially parallel arms secured to said conveyor in vertically spaced relation to said first arms, arranged upon opposite sides of said conveyor and extending in the same direction opposite from that of said first arms, and arranged at right angles to said conveyor, horizontally arranged cone supporting pins projecting normally outward from the outer ends of said second pair of arms and extending in opposite directions, an upright chute within said housing with its upper end adjacent the lower end of said conveyor, and an upright chambered deflector housing centrally arranged within said chute within and through which said conveyor extends, the width of said deflector housing being such that said pins will pass through the same, but the upper horizontal edges of the side walls of said deflector housing will engage said cones as said conveyor is intermittently moved downward for successively disengaging a cone from its supporting pin permitting the same to drop in said chute.

References Cited in the file of this patent

UNITED STATES PATENTS

| Number | Name | Date |
| --- | --- | --- |
| 398,245 | Ford | Feb. 19, 1889 |
| 1,442,953 | Kehoe | Jan. 23, 1923 |
| 1,545,114 | Alyey | July 7, 1925 |
| 2,100,423 | Zeigler | Nov. 30, 1937 |
| 2,441,083 | Rottier | May 4, 1948 |
| 2,604,371 | Smiley | July 22, 1952 |
| 2,606,089 | Hitchings | Aug. 5, 1952 |

FOREIGN PATENTS

| Number | Country | Date |
| --- | --- | --- |
| 42,738 | Germany | of 1888 |